United States Patent

Raasch

[11] Patent Number: 6,036,158
[45] Date of Patent: Mar. 14, 2000

[54] PORTABLE STEERING WHEEL MOUNTED TRAY

[76] Inventor: Matthew E. Raasch, 309 Decatur St., Bakersfield, Calif. 93308

[21] Appl. No.: 09/143,144

[22] Filed: Aug. 28, 1998

[51] Int. Cl.[7] .................................................. A47B 19/00
[52] U.S. Cl. ...................... 248/441.1; 248/352; 248/453; 108/44
[58] Field of Search ................................. 248/441.1, 352, 248/453; 108/44, 47; 224/276, 564

[56] References Cited

U.S. PATENT DOCUMENTS

| | | | |
|---|---|---|---|
| 893,930 | 7/1908 | Lederman | 108/47 |
| 2,299,025 | 10/1942 | McGinley | 311/22 |
| 2,483,043 | 9/1949 | Golden | 108/47 |
| 2,746,821 | 5/1956 | Schroeder | 311/21 |
| 2,856,251 | 10/1958 | Garrison | 311/21 |
| 2,866,381 | 12/1958 | Alldredge | 88/29 |
| 3,051,539 | 8/1962 | Montgomery . | |
| 3,129,032 | 4/1964 | Meyer et al. | 108/47 |
| 3,338,628 | 8/1967 | Evans | 108/47 |
| 3,643,606 | 2/1972 | Vise | 108/44 |
| 3,952,988 | 4/1976 | Easterly . | |
| 4,453,788 | 6/1984 | Russell | 108/44 |
| 4,805,867 | 2/1989 | McAllister . | |
| 4,915,035 | 4/1990 | Clark et al. . | |
| 4,974,805 | 12/1990 | Douglas . | |
| 4,995,637 | 2/1991 | Muraishi | 108/44 |
| 5,060,581 | 10/1991 | Malinski . | |
| 5,177,665 | 1/1993 | Frank et al. | 108/44 |
| 5,386,785 | 2/1995 | Naor | 108/44 |
| 5,413,035 | 5/1995 | Fernandez . | |
| 5,487,521 | 1/1996 | Callahan . | |
| 5,558,026 | 9/1996 | Seibert . | |
| 5,570,642 | 11/1996 | Lehrman | 108/47 |
| 5,662,047 | 9/1997 | Metcalf | 108/44 |
| 5,720,497 | 2/1998 | Lancellotti | 281/45 |
| 5,722,586 | 3/1998 | Hansen | 108/44 |
| 5,749,305 | 5/1998 | Jacovelli . | |
| 5,749,306 | 5/1998 | Breuner . | |
| 5,845,585 | 12/1998 | Meeus et al. | 108/44 |

*Primary Examiner*—Leslie A. Braun
*Assistant Examiner*—Debbie Short
*Attorney, Agent, or Firm*—Richard A. Ryan

[57] ABSTRACT

A portable, rigid tray that may be attached to a steering wheel of a motor vehicle for use as a surface for writing, drawing, using laptop computers and the like. The tray has a generally flat upper surface and a lower surface bound by a distal end, proximal end and opposing side ends. An elongated opening located near the distal end is sized and configured to slide over the top of the typical steering wheel to support the tray at the opposing curved side edges, distal side edge and proximal side edge. An angular member attached to or integral with the lower surface at the proximal side edge causes the tray to extend outwardly and downwardly from the plane of the steering wheel to provide a comfortable, convenient and easy to access work surface for the user sitting in front of the vehicle steering wheel. Other than a spring loaded clip which can be added to the upper surface of the tray, the tray does not utilize any moving parts, allowing it to be molded from a single piece of plastic or other material.

17 Claims, 4 Drawing Sheets

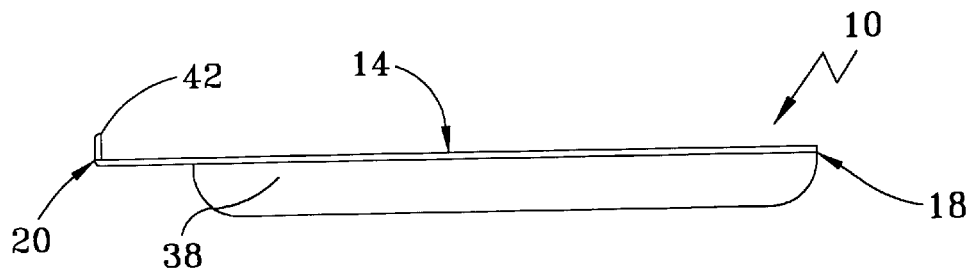
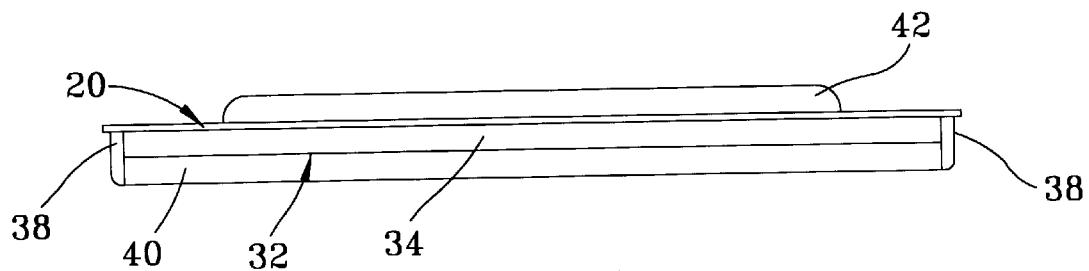
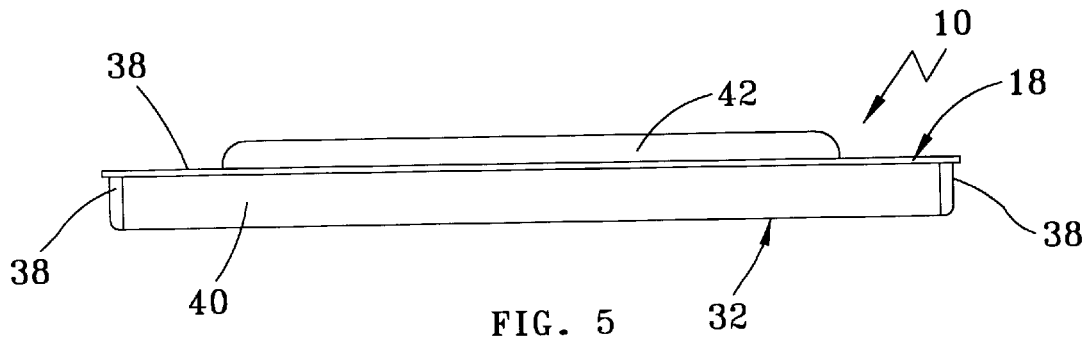
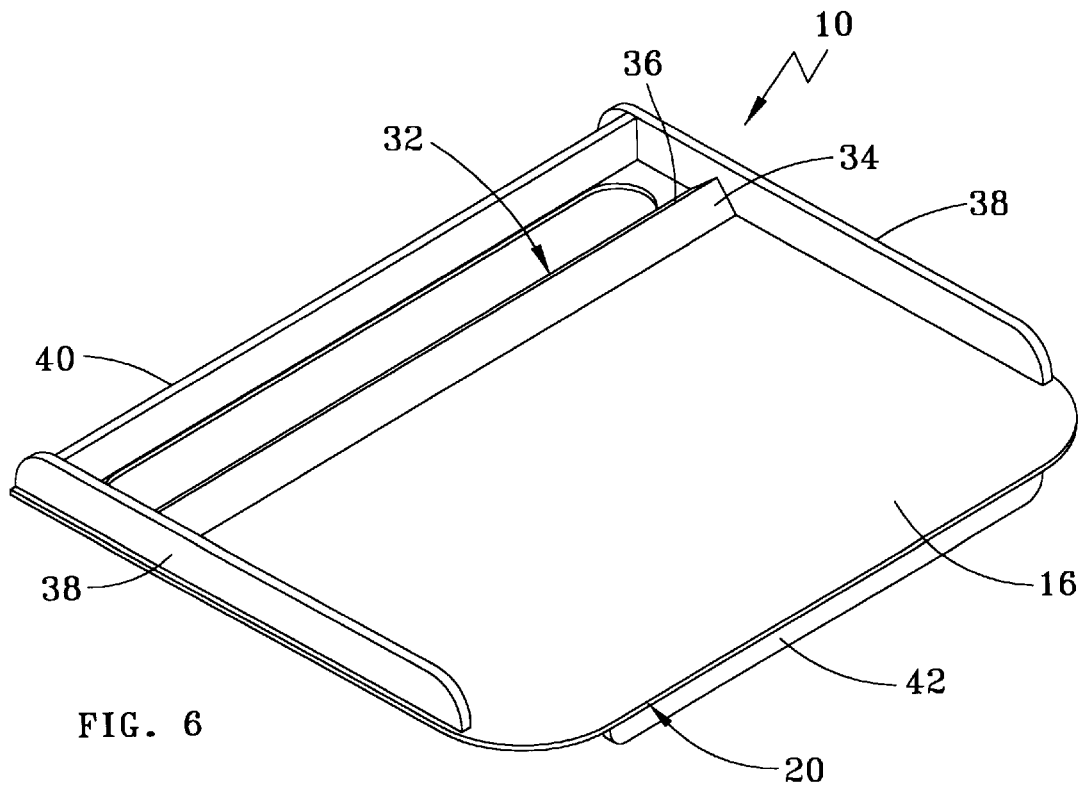

PORTABLE STEERING WHEEL MOUNTED TRAY

BACKGROUND OF THE INVENTION

1. Field of the Invention

The field of the present invention relates generally to trays or tables which are mountable on a vehicle's steering wheel. More particularly, the present invention relates to such steering wheel trays or tables which are portable and suitable for use as a surface for writing, use for laptop computers and other such uses. Even more particularly, the present invention relates to steering wheel mounted trays or tables which extend outwardly from the plane of the steering wheel.

2. Background

Many jobs require the employee to spend a significant portion of his or her time outside of the office at or near his or her vehicle. Even when not working, a number of people sit in their vehicle to view various sporting and other events (such as their child's sport practice) and attempt to get work or other activities accomplished. Much of the work being done by the employee, spectator or others requires or can be better accomplished with a flat, sturdy surface. For instance, writing notes, reports or letters is better accomplished with a flat, sturdy surface. Other activities, such as paying bills, completing forms and drawing, are also easier and better to do on a flat, sturdy surface. The use of portable computers for work or personal activities is also better accomplished with a flat sturdy surface.

3. Related Art

A number of related art devices attempt to provide the benefits needed to accomplish the tasks described above, as well as other related tasks. A number of these patents describe various configurations for steering wheel trays. Most of these patents describe steering wheel trays that are parallel with the plane of the steering wheel. Examples of this type of steering wheel tray can be found in U.S. Pat. No. 4,974,805 to Douglas, U.S. Pat. No. 3,952,988 to Easterly and U.S. Pat. No. 3,051,539 to Montgomery, as well as many others. The devices described by these patents are generally not relevant to the present invention due to the angular configuration of the tray, which limits the use of these devices for writing, laptop computers and other similar uses. A number of other related art patents describe devices which utilize a support portion that lies in the plane parallel with the face of the steering wheel and a tray portion that extends from the support portion somewhat perpendicular to the face of the steering wheel. Many of these describe a tray portion which folds upward into the support portion. Examples of these devices can be found in U.S. Pat. No. 5,749,306 to Breuner, U.S. Pat. No. 5,662,047 to Metcalf, U.S. Pat. No. 5,558,026 to Seibert, U.S. Pat, No. 5,487,521 to Callahan, as well as others. The related art devices described in these patents are generally more complicated, less stable and more costly to manufacture than devices such as those described by the present invention.

Devices somewhat similar to the device described by the present invention are illustrated by U.S. Pat. No. 5,749,305 to Jacovelli and U.S. Pat. No. 4,915,035 to Clark, et al. These patents generally describe single piece devices that attach to a steering wheel to provide a tray that extends outwardly from the plane of the steering wheel. The Jacovelli patent describes a steering wheel tray which slides onto the steering wheel from the bottom and utilizes an attachment tab that holds the device onto the steering wheel. The present invention is distinguishable from the Jacovelli patent in that it slides onto the steering wheel from the top, does not require any moving parts and utilizes an angular member for the tray to extend outwardly from the steering wheel. The Clark, et al. patent describes a food service tray which is held to the steering wheel by two slidable frame members which extend towards the center of the tray. The present invention is distinguishable from the Clark, et al. patent in that it does not use any moving parts, is comprised of a single, relatively solid piece of molded material and utilizes an angular member to extend the tray outwardly from the steering wheel. The angular member used in the present invention is an improvement over the devices described in the Jacovelli and Clark, et al. patents, as well as other related art, due to the angular direction at which it places the tray. The related art devices generally place the tray directly in the user's lap or at the user's chest level, making the related art trays difficult to utilize for some tasks.

Although the above-described patents, as well as other related patents, describe various steering wheel trays, none of the relate art devices describe, singularly or in combination, a simple to make and use tray that is made of a solid, single piece of molded material that utilizes an angular member to extend outwardly from the plane of the steering wheel. Consequently, a need exists for a steering wheel tray that is inexpensive to manufacture and easy to use, yet which provides a flat and relatively strong surface for writing, using a portable computer and other such uses.

SUMMARY OF THE INVENTION

The portable steering wheel mounted tray of the present invention provides the benefits and solves the problems identified above. That is to say, the present invention provides a steering wheel mounted tray that is inexpensive to manufacture, easy to use, extends outwardly from the plane of the steering wheel and provides a surface suitable for writing or using a portable computer, as well as other uses.

The steering wheel tray of the present invention can be made of a single piece of molded material that provides a flat, sturdy upper surface of generally rectangular or square shape. Near the distal end of the tray (the side of the tray furthest from the driver seated in front of the steering wheel) is an elongated opening which supports the tray on the steering wheel. In the preferred embodiment, the elongated opening has opposed curved sides, a generally perpendicular distal side and an angular proximal side (the side of the opening nearest the driver seated in front of the steering wheel). The angular proximal side of the elongated opening can be a separate member attached to the lower surface of the tray or be molded with the tray as a single piece. The proximal end of the tray can have an upwardly extending lip to support books, writing pads, portable computers and other items that may be placed on the tray. The preferred embodiment utilizes a downwardly extending stiffening member, at or near each opposing side end of the tray and along the tray's distal end, to provide additional structural support and rigidity for the tray.

Various components can be added to the steering wheel tray of the present invention to enhance its usability and increase its versatility. For instance, attached to the upper surface can be one or more clamping members, such as a clip, suitable for clamping down and holding onto a piece of paper or book placed on the upper surface. The upper surface can be configured with a hinged door that opens to a storage area underneath. Alternatively, the lower surface can comprise a drawer slidably mounted on the tray for storing items. The tray can have one or more hinged connections that allow the user to fold the tray for storage when not in use.

Accordingly, the primary objective of the present invention is to provide a rigid steering wheel tray which can be inexpensively made and easily utilized as a writing surface or for holding a laptop computer, or other items, in a useable, generally outward and downward position.

It is also an important objective of the present invention to provide a steering wheel tray which slides over the top of the steering wheel and which utilizes an angular member to extend the tray outwardly from the plane of the steering wheel.

It is also an important objective of the present invention to provide a steering wheel tray that is supportable on a steering wheel in a direction that extends outwardly from the steering wheel regardless of the width and thickness of the steering wheel.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention:

FIG. 3 is a side view of the present invention showing use of the side stiffening member, the other side view being the same;

FIG. 4 is a front view from of the present invention showing the distal stiffening member and the angular member;

FIG. 5 is a back view of the present invention showing the distal stiffening member;

FIG. 6 is a bottom perspective view of the present invention showing the lower surface and the angular member;

DETAILED DESCRIPTION OF THE PREFERRED EMBODIMENTS

Figure 1:
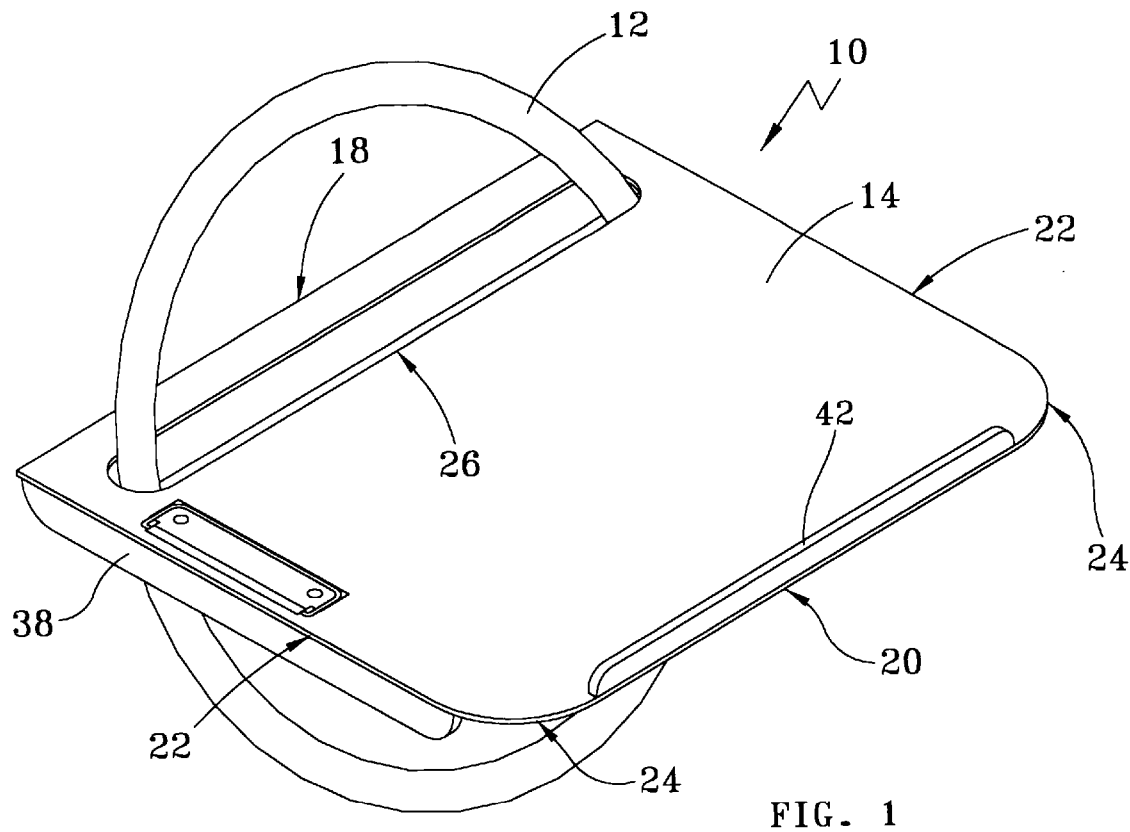
FIG. 1 is a top perspective view of the steering wheel mounted tray of the present invention showing the tray mounted on a steering wheel.
Figure 2:
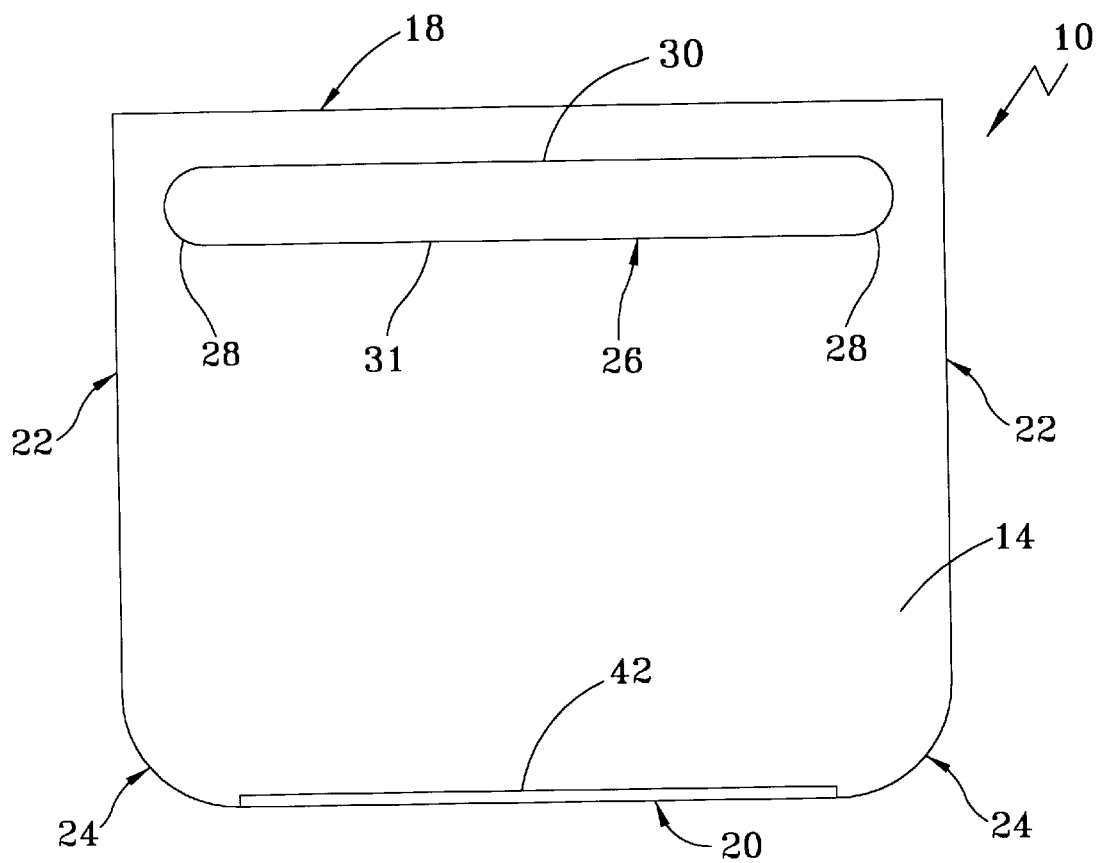
FIG. 2 is a top view of the present invention.

With reference to the figures where like elements have been given like numerical designations to facilitate the reader's understanding of the present invention, and particularly with reference to the embodiment of the present invention illustrated in FIGS. 1 through 6, the preferred embodiment of the present invention is set forth below. The portable steering wheel mounted tray, designated generally as 10, is designed and configured to extend outwardly from a vehicle steering wheel 12, as shown in FIG. 1. As best shown in FIGS. 1, 2 and 6, tray 10 has a generally flat upper surface 14 and a lower surface 16. The upper 14 and lower 16 surfaces are bounded by a distal end 18 located at the side of the tray away from the user in the driver's seat of the vehicle, a proximal end 20 located at the side of the tray nearest the user in the driver's seat and a pair of opposing side ends 22. The corners 24 of the proximal end 20 can be rounded to reduce the likelihood of the corner protruding into the user or snagging the user's clothes.

Tray 10 can be made of any material that is suitable for providing a stiff, sturdy working surface for writing, drawing or using a laptop computer. In the preferred embodiment, tray 10 is molded from a stiff plastic material such as ABS plastic, which provides a rugged, strong working surface. Tray 10 should be sized and configured to provide sufficient work surface to be useful to the average person, yet not be too large so as to not be useable. If tray 10 is too wide it could interfere with the opening and closing of the vehicle door and if it is too deep (i.e., from the proximal end 20 to the elongated opening 26) it could push into the user or leave insufficient room for the user in the vehicle driver's seat. The inventor has found that a tray 10 approximately 16.5 inches wide by 14 inches total depth (resulting in a work surface of approximately 16 inches by 11.25 inches in the preferred embodiment) is generally sufficient work space without unduly intruding into the driver's space.

Located near distal end 18 is elongated opening 26 that goes through the upper 14 and lower 16 surfaces of tray 10. In the preferred embodiment, elongated opening 26 has opposing curved side edges 28 which are spaced apart a distance to facilitate steering wheel 12 rigidly supporting tray 10 when in use. The inventor has found that opposing side edges 28 spaced apart approximately 14.5 inches provides sufficient spacing for the typical steering wheel 12 to allow tray 10 to hang on steering wheel 12 a sufficient distance down to be useable for the average user. Further supporting tray 10 on steering wheel 12 is distal edge 30 and opposing proximal edge 31. Distal edge 30 and proximal edge 31 should be spaced apart sufficient distance to allow elongated opening to go over and slide partially down the typical steering wheel 12. The inventor has found that having distal edge 30 spaced approximately 1.5 inches from proximal edge 31 is generally sufficient to allow tray 10 to slide over the typical steering wheel 12, yet provide sufficient contact against steering wheel 12 to provide support for tray 10 and items placed thereon.

Located at proximal edge 31 of the elongated opening 26 is an angular member 32 having a proximal side face 34 and a distal side face 36, as shown in FIG. 6. In the preferred embodiment, distal side face 36 is at an angle of approximately 45 degrees from the plane of upper surface 14. The inventor has found that angles ranging between 30 and 60 degrees also provide sufficient downward and outward projection of tray 10 to be useable by the average user. The angular member 32 having a distal side face 36 angle of approximately 45 degrees will result in the tray being cantilevered at an angle of approximately 45 degrees from the plane of the steering wheel 12. At this angle, which is desirable over those devices which place the tray at an angle that is in or close to the plane of the steering wheel or those that place the tray perpendicular to the steering wheel, the user has easy, comfortable and convenient access to the upper surface 14 for writing or as a support for a laptop computer. With the above-described configuration, the user sits at the steering wheel and is able to use the tray as he or she would a desk or other writing surface. Angular member 32 also provides support to tray 10 to stiffen the upper surface 14 when in use. If desired to improve stability under heavier loads, the upper portion of distal edge 30 can also be angled at the same angle as distal side face 36 to provide further support for tray 10 on steering wheel 12.

In the preferred embodiment, tray 10 has a pair of opposing side stiffening members 38, shown best in FIGS. 1 and 3, located near the opposing side ends 22 and a third stiffening member 40, best shown in FIGS. 4 and 5, located near the distal end 18 of tray 10. The stiffening members 38 and 40 provide support for upper surface 14 to prevent undue flexing of tray 10 when heavy items are placed on tray 10 or when the user places his or her arms on tray 10. Located near proximal end 20 of the preferred embodiment of tray 10 is an upwardly extending lip 42 that helps hold papers, books or a laptop computer on tray 10 during use and provides additional stiffening support for tray 10. Also in the preferred embodiment is a clamping member 44, such as the spring-loaded clip shown in FIG. 7, for holding papers, books or other materials on tray 10 to prevent the wind from blowing those materials off of tray 10.

In use, tray 10 is placed on steering wheel 12 by sliding the elongated opening 26 over the top of steering wheel 12 until tray 10 can no longer move downward. When downward movement of tray 10 stops, tray 10 will be sturdy against steering wheel 12 to allow the user to lean against the upper surface 14 to write, use a laptop computer or perform other tasks. Because there are no moving parts, the user does not have to set or unset any components to utilize tray 10. Angular member 32 will place tray 10 in the proper position for use and the edges of elongated opening 26 will support tray 10 on steering wheel 12.

Figure 7:
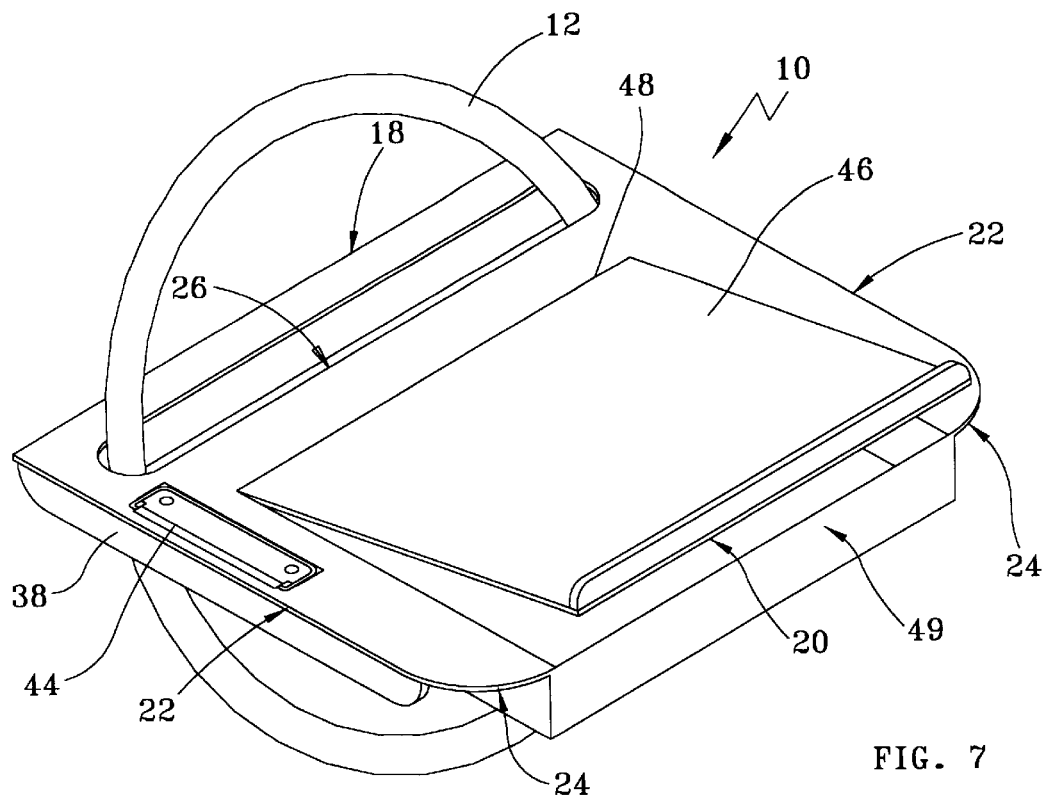
FIG. 7 is a top perspective view of an alternative embodiment of the present invention showing the use of a clamping member and a hinged top section.
Figure 8:
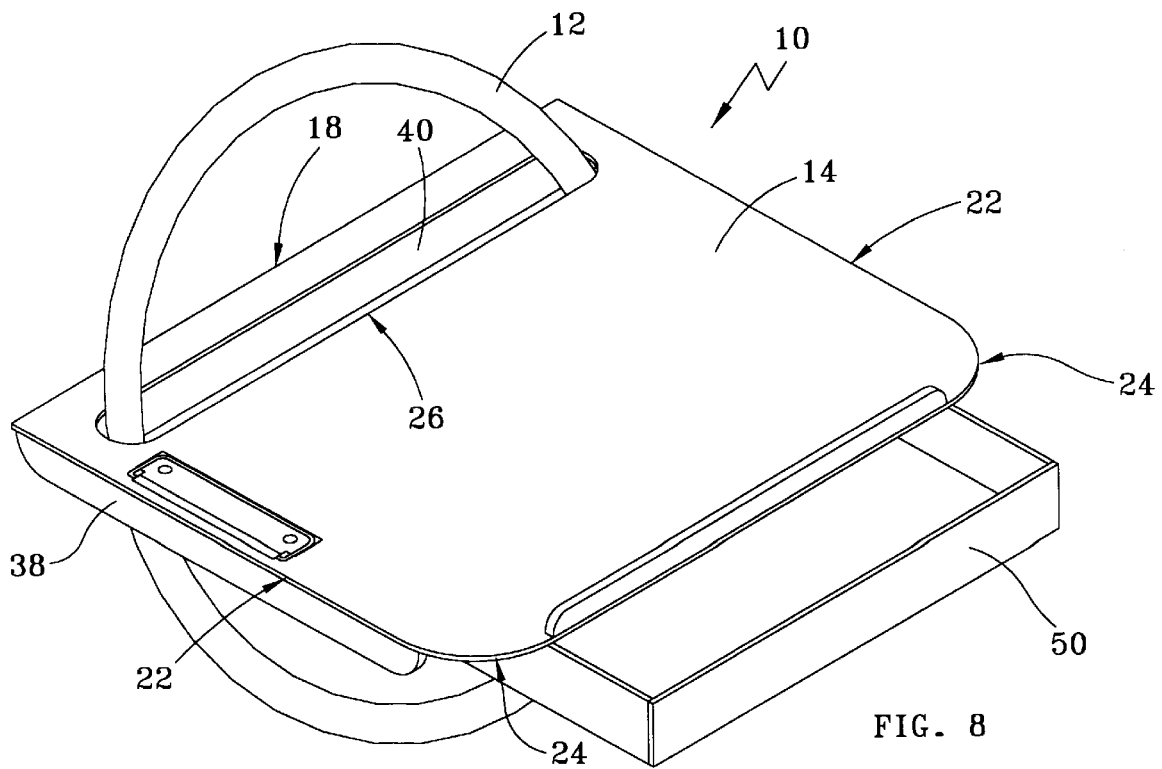
FIG. 8 is a top perspective view of an alternative embodiment showing the use of a slidably mounted drawer.
Figure 9:
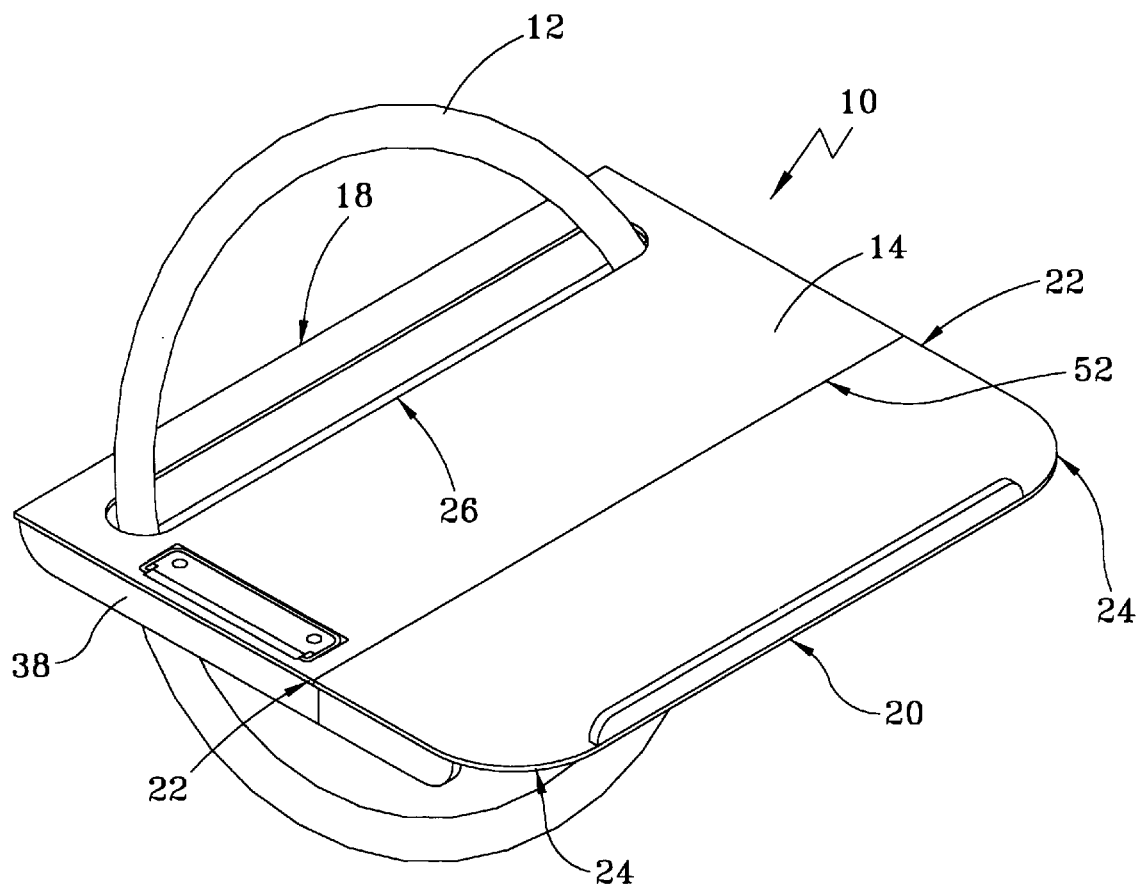
FIG. 9 is a top perspective view of an alternative embodiment showing the use of a hinge member across the upper surface.

An alternative embodiment of tray 10 of the present invention, shown in FIG. 7, utilizes a hinged top section 46 located in upper surface 14. Hinged top section 46 is attached to upper surface 14 by hinge 48 to allow the user to raise top section 46 and gain entry to storage compartment 49 located under upper surface 14. Storage compartment 49 can be used to store paperwork, pencils, rulers, disks and other items that would be useful in conjunction with tray 10. Alternatively, tray 10 can utilize a drawer 50, shown in FIG. 8, slidably mounted to or on tray 10. Although not shown in the accompanying drawings, drawer 50 can slidably attach to lower surface 16 or to the opposing side stiffening members 38. In yet another alternative embodiment, tray 10 can comprise at least one second hinge 52 that extends from one side end 22 to the other to allow tray 10 to be folded in one-half or one-third for storing the tray 10 when not in use. The second hinge 52 should be configured so as to not interfere with the upper surface 14 when tray 10 is in use.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A steering wheel tray for use on a vehicle steering wheel, comprising:

a tray having a generally flat upper surface, a lower surface, a distal end, a proximal end opposing said distal end and a pair of opposing side ends;

an elongated opening in said tray near said distal end, said elongated opening having a distal edge and an opposing proximal edge; and an angular member at said proximal edge of said elongated opening, said angular member having a planar side face sized and configured to extend said tray from the plane of the steering wheel in a generally outwardly and downwardly direction, said side face having a first edge connected substantially adjacent said elongated opening and extending away from said opening toward the front of the tray.

2. The steering wheel tray according to claim 1, wherein said distal side edge of said elongated opening is generally perpendicular to the plane of said tray.

3. The steering wheel tray according to claim 1, wherein said elongated opening has a pair of opposing curved side edges.

4. The steering wheel tray according to claim 1, wherein said tray is made of a stiff plastic material.

5. The steering wheel tray according to claim 1, wherein said angular member is integral with said tray.

6. The steering wheel tray according to claim 1, wherein said angular member has a distal side face extending downwardly from said lower surface at an angle of approximately 45 degrees.

7. The steering wheel tray according to claim 1 further comprising at least one stiffening member attached to or integral with said lower surface of said tray.

8. The steering wheel tray according to claim 1 further comprising an upwardly extending lip near said proximal end of said tray.

9. The steering wheel tray according to claim 1 further comprising one or more clamping means on said upper surface of said tray.

10. The steering wheel tray according to claim 1 further comprising a storage compartment attached to or integral with said tray.

11. The steering wheel tray according to claim 10, wherein said storage compartment is slidably attached to said tray.

12. The steering wheel tray according to claim 10 further comprising a door hingedly attached to said upper surface for access to said storage compartment.

13. The steering wheel tray according to claim 1 further comprising one or more hinge means in said tray for folding said tray.

14. A steering wheel tray for use on a vehicle steering wheel, comprising:

a tray having a generally flat upper surface, a lower surface, a distal end, a proximal end opposing said distal end and a pair of opposing side ends;

an elongated opening in said tray near said distal end, said elongated opening having a distal edge and an opposing proximal edge;

an angular member at said proximal edge, said angular member located substantially adjacent said elongated opening and having a distal side face extending downwardly from said lower surface at an angle of approximately 45 degrees to extend said tray from the plane of the steering wheel in a generally outwardly and downwardly direction away from said elongated opening; and at least one stiffening member attached to or integral with said lower surface of said tray.

15. The steering wheel tray according to claim 14, wherein said tray is made of a stiff plastic material.

16. The steering wheel tray according to claim 14, wherein said elongated opening has a pair of opposing curved side edges.

17. A steering wheel tray for use on a vehicle steering wheel, comprising:

a tray made of a stiff plastic material having a generally flat upper surface, a lower surface, a distal end, a proximal end opposing said distal end and a pair of opposing side ends;

an elongated opening in said tray near said distal end, said elongated opening having a distal edge, an opposing proximal edge and a pair of opposing curved side edges;

an angular member at said proximal edge, said angular member having a distal side face extending downwardly from said lower surface at an angle of approximately 45 degrees to extend said tray from the plane of the steering wheel in a generally outwardly and downwardly direction away from said elongated opening; and at least one stiffening member attached to or integral with said lower surface of said tray.

* * * * *